(12) United States Patent
Miller (10) Patent No.: US 9,517,438 B2
(45) Date of Patent: Dec. 13, 2016

(54) PROGRAMMABLE MEMBRANE SYSTEM (75) Inventor: Seth Adrian Miller, Englewood, CO (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 1030 days.

(21) Appl. No.: 13/383,955

(22) PCT Filed: Jun. 13, 2011

(86) PCT No.: PCT/US2011/040149
§ 371 (c)(1),
(2), (4) Date: Jan. 13, 2012

(87) PCT Pub. No.: WO2012/173592
PCT Pub. Date: Dec. 20, 2012

(65) Prior Publication Data
US 2012/0312737 A1 Dec. 13, 2012

(51) Int. Cl.
B01D 67/00 (2006.01)
B01D 61/46 (2006.01)
B01D 71/10 (2006.01)
B01D 63/10 (2006.01)
C02F 1/44 (2006.01)
B82Y 30/00 (2011.01)

(52) U.S. Cl.
CPC ........... *B01D 67/0093* (2013.01); *B01D 61/46* (2013.01); *B01D 71/10* (2013.01); *B82Y 30/00* (2013.01); *B01D 63/10* (2013.01); *B01D 2323/38* (2013.01); *B01D 2325/26* (2013.01); *C02F 1/44* (2013.01)

(58) Field of Classification Search
None
See application file for complete search history.

(56) References Cited

U.S. PATENT DOCUMENTS 5,538,642 A 7/1996 Solie
5,683,916 A 11/1997 Goffe et al.
(Continued)

FOREIGN PATENT DOCUMENTS

JP H06238141 8/1994
JP 2011502749 1/2011
(Continued)

OTHER PUBLICATIONS

Aoki, N., "Carbon Nanotubes as Scaffolds for Cell Culture and Effect on Cellular Functions," Dental Materials Journal, vol. 26, No. 2, pp. 178-185 (2007).
(Continued)

Primary Examiner — Krishnan S Menon
(74) Attorney, Agent, or Firm — Dorsey & Whitney LLP (57) ABSTRACT Functionalized membranes for use in applications, such as electrodeionization, can be prepared simply and efficiently by associating a first element of a specific binding pair to a membrane surface and binding a second species comprising the second element of the specific binding pair and at least one functional group to form a complex on the membrane surface. Such membranes may be reversibly modified by disassociating the complex, thereby, providing a fresh surface which may be re-modified according to the preceding methods.

15 Claims, 1 Drawing Sheet

(56) References Cited

U.S. PATENT DOCUMENTS

| | | | |
|---|---|---|---|
| 6,468,657 | B1 | 10/2002 | Hou et al. |
| 6,491,934 | B1 | 12/2002 | Bekele |
| 7,037,425 | B2 | 5/2006 | Lee et al. |
| 7,211,320 | B1 | 5/2007 | Cooper et al. |
| 7,229,556 | B1 * | 6/2007 | Hinds, III ............ A61N 1/0412 210/257.2 |
| 7,611,628 | B1 | 11/2009 | Hinds, III |
| 7,914,875 | B2 | 3/2011 | Jiang et al. |
| 2002/0027072 | A1 | 3/2002 | Cui et al. |
| 2003/0191302 | A1 | 10/2003 | Kolzau et al. |
| 2004/0126899 | A1 * | 7/2004 | Lee ...................... G01N 33/537 436/518 |
| 2005/0263456 | A1 | 12/2005 | Cooper et al. |
| 2006/0292680 | A1 | 12/2006 | Barbari et al. |
| 2008/0093224 | A1 | 4/2008 | Tour et al. |
| 2008/0160384 | A1 | 7/2008 | Iqbal et al. |
| 2008/0292887 | A1 | 11/2008 | Kim et al. |
| 2009/0001009 | A1 | 1/2009 | Linder et al. |
| 2009/0321355 | A1 | 12/2009 | Ratto et al. |
| 2010/0068461 | A1 | 3/2010 | Wallace et al. |
| 2010/0140097 | A1 | 6/2010 | Wei et al. |
| 2011/0168560 | A1 | 7/2011 | Afzali-Ardakani et al. |
| 2011/0174629 | A1 | 7/2011 | Bouchet et al. |
| 2012/0160694 | A1 | 6/2012 | Wolters et al. |
| 2012/0312687 | A1 | 12/2012 | Miller |
| 2012/0312691 | A1 | 12/2012 | Miller |
| 2013/0161602 | A1 | 6/2013 | James et al. |

FOREIGN PATENT DOCUMENTS

| | | |
|---|---|---|
| WO | WO 02/04918 | 1/2002 |
| WO | WO 02/060812 | 8/2002 |
| WO | WO 02/096979 | 12/2002 |
| WO | WO 2008/028155 | 3/2008 |
| WO | WO 2009109727 | 9/2009 |
| WO | WO 2009/148959 | 12/2009 |

OTHER PUBLICATIONS

Astell, C.V., and Smith, M., "Thermal Elution of Complementary Sequences of Nucleic Acids from Cellulose Columns with Covalently Attached Oligonucleotides of Known Length and Sequence," Journal of Biological Chemistry, vol. 246, pp. 1944-1946 (1971).

Gilham, P.T., "Complex Formation in Oligonucleotides and Its Application to the Separation of Polynucleotides," J. Am. Chem. Soc., vol. 84, No. 7, pp. 1311-1312 (1962).

Gilham., P.T., "The Synthesis of Polynucleotide-Celluloses and Their Use in the Fractionation of Polynucleotides," J. Am. Chem. Soc. vol. 86, No. 22, pp. 4982-4985 (1964).

Jovin, T.M., and Kornberg, A., "Polynucleotide Celluloses as Solid State Primers and Templates for Polymerases," Journal of Biological Chemistry, vol. 243, pp. 250-259 (1968).

Litman, R.M., "A Deoxyribonucleic Acid Polymerase from Micrococcus luteus (Micrococcus lysodeikticus) Isolated on Deoxyribonucleic Acid-Cellulose ," Journal of Biological Chemistry, vol. 243, pp. 6222-6233 (1968).

Mangalam, A.P., et al., "Cellulose/DNA Hybrid Nanomaterials." Biomacromolecules, vol. 10, No. 3, pp. 497-504 (2009).

Moss, L.G., et al., "A simple, efficient method for coupling DNA to cellulose. Development of the method and application to mRNA purification," Journal of Biological Chemistry, vol. 256, pp. 12655-12658 (1981).

Naylor, R., and Gilham, P.T., "Studies on Some Interactions and Reactions of Oligonucleotides in Aqueous Solution," Biochemistry, vol. 5, No. 8, pp. 2722-2728 (1966).

Niemeyer, C.M., "The developments of semisynthetic DNA-protein conjugates," Trends in Biotechnology, vol. 20, Issue 9, pp. 395-401 (2002).

Pinson J., and Podvorica, F., "Attachment of organic layers to conductive or semiconductive surfaces by reduction of diazonium salts," Chemical Society Review, vol. 34, pp. 429-439 (2005).

Rakov, E.G., "Chemistry of Carbon Nanotubes," in Nanotubes and Nanofibers, Gogotsi, Y., eds., Taylor & Francis, pp. 37-108 (2006).

Waje, M.M., et al., "Deposition of platinum nanoparticles on organic functionalized carbon nanotubes grown in situ on carbon paper for fuel cells," Nanotechnology, vol. 16, No. 7, p. S395 (2005).

Yamada, M., et al., "UV-Irradiated DNA Matrix Selectively Accumulates Heavy Metal Ions," Bulletin of the Chemical Society of Japan, vol. 75, No. 7, pp. 1627-1632 (2002).

Yamada, M., et al., "UV-Irradiated DNA Matrixes Selectively Bind Endocrine Disruptors with a Planar Structure," Environmental Science Technology, vol. 36, No. 5, pp. 949-954 (2002).

Yamada, M., et al., "UV-irradiation-induced DNA immobilization and functional utilization of DNA on nonwoven cellulose fabric," Biomaterials, vol. 22, Issue 23, pp. 3121-31269 (2001).

Zhu, B-K., et al., "Preparation and properties of the polyimide/multi-walled carbon nanotubes (MWNTs) nanocomposites," Composite Science Technology, vol. 66, Issue 3-4, pp. 548-554 (2006).

Author Unknown, "Electrodeionization", http://en.wikipedia.org/wiki/Electrodeionization, Jan. 2010, 6 pages.

Author Unknown, "Mustang® Membrane Devices for Ion Exchange Chromatography", Pall Corporation, http://www.pall.com/laboratory_7001.asp, Jan. 2010, 2 pages.

Author Unknown, "Technology Introduction", New Logic Research, Inc., http://www.vsep.com/technology/index.html, Jun. 2009, 4 pages.

Bahr et al., "Functionalization of Carbon Nanotubes by Electrochemical Reduction of Aryl Diazonium Salts: A Bucky Paper Electrode", J. Am. Chem. Sci., 2001, 123(27), pp. 6536-6542.

Balasubramanian et al., "Chemically Functionalized Carbon Nanotubes", www.small-journal.com, 2005, 1(2), pp. 180-192.

Balasubramanian et al., "Electrochemically Functionalized Carbon Nanotubes for Device Applications", Journal of Materials Chemistry, 2008, 18, pp. 3071-3083.

Bruggen, "Chemical Modification of Polyethersulfone Nanofiltration Membranes: A Review", Journal of Applied Polymer Science, 2009, vol. 114, Issue 1, pp. 630-642.

Chu et al., "Thermoresponsive transport through porous membranes with grafted PNIPAM gates", AIChE Journal, 2004, 49(4), pp. 896-909.

Dey, "Performance of cross-flow spiral-wound EDI modules", http://www.watertechonline.com/article.asp?IndexID=6635678, Oct. 2005, 5 pages.

Fischer-Frühholz, "Sartobind Membrane Adsorbers", Startorius Stedim Biotech, Aug. 4, 2009, 41 pages.

Fulghum et al., "Stimuli-Responsive Polymer Ultrathin Films with a Binary Architecture: Combined Layer-by-Layer Polyelectrolyte and Surface-Initiated Polymerization Approach", Macromolecules, 2008, 41(2), pp. 429-435.

Hinds et al., "Aligned Multiwalled Carbon Nanotube Membranes", Science, Jan. 2, 2004, 303, 5 pages.

Hu et al., "Fabrication of thin-film electrochemical sensors from single-walled carbon nanotubes by vacuum filtration", Carbon, vol. 48, Issue 5, Apr. 2010, pp. 1345-1352.

Huang et al., "Biotin-Derivatized Poly(L-lysine)-g-poly(ethylene glycol): A Novel Polymeric Interface for Bioaffinity Sensing", Langmuir, 2002, 18(1), pp. 220-230.

International Patent Application No. PCT/US2011/040145: International Search Report dated Jul. 26, 2011, 18 pages.

International Patent Application No. PCT/US2011/040149: International Search Report dated Aug. 2, 2011, 12 pages.

International Patent Application No. PCT/US2011/040148: International Search Report dated Aug. 22, 2011, 12 pages.

Ismail et al., "Transport and Separation Properties of Carbon Nanotube-Mixed Matrix Membrane", Separation and Purification Technology, 2009, 70, pp. 12-26.

Kato et al., Immobilization of DNA onto a Polymer Support and Its Potentiality as Immunoadsorbent, Biotechnology and Bioengineering, Sep. 1996, vol. 51, Issue 5, pp. 581-590.

Kou et al., "Electrochemical atomic layer deposition of a CuInSe2 thin film on flexible multi-walled carbon nanotubes/polyimide (56) References Cited

OTHER PUBLICATIONS nanocomposite membrane: Structural and photoelectrical characterizations", Electrochimica Acta, vol. 56, Issue 16, Jun. 30, 2011, pp. 5575-5581.
Landers et al., "Prevention of Influenza Pneumonitis by Sialic Acid-Conjugated Dendritic Polymers", The Journal of Infectious Disease, Nov. 2002, 186(9), pp. 1222-1230.
Leiknes et al., "Removal of natural organic matter (NOM) in drinking water treatment by coagulation-microfiltration using metalmembranes", Journals of Membrane Science, vol. 242, Issues 1-2, Oct. 15, 2004, pp. 47-55.
Mucic et al., "DNA-Directed Synthesis of Binary Nanoparticle Network Materials", J. Am. Chem. Soc., Jul. 31, 1998, 120, pp. 12674-12675.
Prakash et al., Surface Modification in Microsystems and Nanosystems:, Surface Science Reports, 2009, vol. 64, Issue 7, pp. 233-254.
Song et al., "Multilayer structured amperometric immunosensor based on gold nanoparticles and Prussian blue nanoparticles/nanocomposite functionalized interface", Electrochimica Acta, vol. 55, Issue 5, Feb. 1, 2010, pp. 1778-1784.
Ulbricht, "Advanced Functional Polymer Membranes", Polymer, Mar. 2006, vol. 47, Issue 7, pp. 2217-2262.
Vogt et al., "Are Carbon Nanotubes the Ultimate Water Transporters?", http://www.azonano.com/details.asp?Articled=2422, Oct. 2009, 3 pages.
Wildgoose et al., "Chemically Modified Carbon Nanotubes for Use in Electroanalysis", Microchim Acta 152, 2006, pp. 187-214, published on-line Nov. 30, 2005.
Wu et al., "Programmable Transdermal Drug Delivery of Nicotine Using Carbon Nanotube Membranes", PNAS, www.pnas.org/cgi/doi/10.1073/pnas.1004714107, Jun. 29, 2010, 107(26), 5 pages.
Bahshi et al., "Following the Biocatalytic Activities of Glucose Oxidase by Electrochemically Cross-Linked Enzyme-Pt Nanoparticles Composite Electrodes", Anal. Chem. 2008, vol. 80, No. 21, pp. 8253-8259 (Oct. 2008).
Bradley, J.C., et al., "Bipolar Electrodeposition of Polypyrrole onto Both Ends of a Carbon Nanotube," SMIRP Bradley Research lab Knowledge Product, pp. 1-6 (Jan. 2003).
Breuer, 0. et al., "Big Returns From Small Fibers: A review of Polymer/Carbon Nanotube Composites", Polymer Composites, vol. 25, No. 6, Dec. 2004, 630-645 (Dec. 2004).
Koizumi, "Vertical Embedding of Carbon Nanotubes on Electrode Covered with Track Etch Membrane", Japanese Journal of Applied Physics, vol. 43, No. 12, 2004, pp. 8374-8375 (Dec. 9, 2004).
Lim et al., "A glucose biosensor based on electrodeposition of palladium nanoparticles and glucose oxidase onto Nafion-solubilized carbon nanotube electrode", Biosensors and Bioelectronics, vol. 20, Issue 11, (May 15, 2005) pp. 2341-2346.
Liu, T., et al., "Preparation and characterization of carbon nanotube/polyetherimide nanocomposite films", Composites Science and Technology, vol. 67, Issues 3-4, DOI: 10.1016/j.compscitech.2006.09.007, Mar. 2007, pp. 406-412 (Mar. 2007).
Lu, W., et al., "Carbon Nanotube Supercapacitor", Carbon Nanotubes, Chapter 29, pp. 564-590 (Mar. 2010) ISBN: 978-953-307-054, InTech.
Thesis, M.S., "Protein covalent modification on diamand and glassy carbon and electrochemical biosensing," Tongji University (Shanghai, China) pp. 1-6 (Mar. 2007) (English Abstract).
Wang, Rui-xiang "Method for Non-Corrosive Removal of Copper-Nickle-Chromium Coatings on Steel Substrate", Electoplating & Finishing, vol. 29 No. 4, 29-30, Apr. 30, 2010.
Zhang, et al., "A sensitive DNA biosensor fabricated with gold nanoparticles/ploy (p-aminobenzoic acid)/carbon nanotubes modified electrode", Colloids and Surfaces B: Biointerfaces, vol. 75, Issue 1, pp. 179-185 (Sep. 2009) DOI: 10.1016/j.colsurfb.2009.08.030, Jan. 2010.
U.S. Appl. No. 13/378,976, Oct. 27, 2014, Office Action.
U.S. Appl. No. 13/378,976, Jun. 1, 2015, Office Action.
U.S. Appl. No. 13/383,802, Aug. 29, 2013, Office Action.
U.S. Appl. No. 13/383,802, Nov. 8, 2013, Office Action.
U.S. Appl. No. 13/383,802, Apr. 25, 2014, Office Action.
U.S. Appl. No. 13/383,802, Jul. 7, 2014, Office Action.
U.S. Appl. No. 13/383,802, Oct. 8, 2014, Office Action.
U.S. Appl. No. 13/383,802, May 21, 2015, Office Action.
U.S. Appl. No. 13/383,802, Aug. 17, 2015, Office Action.
U.S. Appl. No. 13/378,976, Nov. 2, 2015, Office Action.
Mahouche-Chergui et al. "Aryl diazonium salts: a new class of coupling agents for bonding polymers, biomacromolecules and nanoparticles to surfaces" Chemical Society Reviews, 2011, 40, 4143-4166.
U.S. Appl. No. 13/378,976, Mar. 23, 2016, Notice of Allowance.
U.S. Appl. No. 13/383,802, Feb. 10, 2016, Office Action.

* cited by examiner

PROGRAMMABLE MEMBRANE SYSTEM

CROSS-REFERENCE TO RELATED APPLICATIONS

This application is the U.S. National Stage filing under 35 U.S.C. §371 of International PCT/US2011/040149, filed Jun. 13, 2011, the disclosure of which is incorporated herein by reference in its entirety.

TECHNICAL FIELD

The disclosure relates to reversibly modifiable membranes, methods for their preparation, modification, and recycling; and uses thereof, such as, for air or water purification.

BACKGROUND

Smart membranes today have a very limited range of performance. Membranes exist that can switch hydrophobicity based on pH or temperature signals, and conducting polymer membranes that can swell and shrink as they are charged and discharged, to modulate pore size. For example, smart membranes have largely consisted of membranes containing a thermally responsive polymer such as PNIPAM; pH-responsive polymers based on carboxylates or amines; or both simultaneously. The active component of these membranes is covalently grafted to the base membrane using methods that are not extendable to a wide variety of functionalities.

That is, while technologies exist that enable a membrane surface to be modified, they are very challenging and inefficient. A goal for 'smart membrane' technology is to offer a wide range of membrane functionality to suit an individual application, but today such customization can be expensive.

SUMMARY

In one aspect, the present disclosure provides a method of customizing a membrane that is simple and robust enough to be completed by the membrane users, so that a single base membrane can be produced in high volume, and optimized for each application as needed.

In a first aspect, the present disclosure provides methods for preparing a reversibly-functionalized membrane comprising: contacting a membrane with a solution, wherein the membrane comprises a surface having a first species operatively attached thereto, wherein the first species comprises a first element of a specific binding pair; and the solution comprises a second species comprising a second element of the specific binding pair and at least one functional group, wherein each of the at least one functional group is chemically bonded either directly or through a linking group to the second element of the specific binding pair.

In another aspect, the present disclosure provides functionalized membranes prepared according to the preceding aspect, and any embodiment thereof.

In another aspect, the present disclosure provides functionalized membranes comprising:
a membrane and a complex operatively attached to a surface of the membrane, wherein the complex is formed by a specific binding pair, wherein the first element of the specific binding pair is chemically bonded either directly or through a linking group to the surface of the membrane; and the second element of the specific binding pair is chemically bonded either directly or through a linking group to a functional group.

In another aspect, the present disclosure provides filtration membrane modules comprising any of the membranes described herein.

In another aspect, the present disclosure methods comprising subjecting any reversibly-functionalized membrane described herein to conditions suitable for disassociating the complex.

In another aspect, the present disclosure methods method for changing the pore size of a porous membrane comprising: contacting any of the membranes described herein with metal nanoparticles, wherein at least a portion of the functional groups present are capable of bonding to or coordinating to the nanoparticles; and the membrane is a porous membrane.

In another aspect, the present disclosure methods method for changing the pore size of a porous membrane comprising: contacting a membrane with a solution, wherein the membrane is a porous membrane and comprises a surface having a first species operatively attached thereto, wherein the first species comprises a first element of a specific binding pair; and the solution comprises a second species comprising a second element of the specific binding pair; and at least one functional group, wherein each functional group is chemically bonded either directly or through a linking group to the second element of the specific binding pair, wherein upon contacting, the first and second elements of the specific binding pair form a complex on the surface of the membrane, and wherein at least one functional group comprises nanoparticles.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure provides air and/or filtration membranes that are simple to modify and methods for their modification by utilizing a member of a specific binding pair associated with the membrane and a second member of the binding pair associated with one or more functional groups capable of modifying a property of the membrane in a robust process. In one embodiment, the disclosure provides air filtration membranes. In another embodiment, the disclosure provides water filtration membranes. By using the concepts described herein, a single base membrane module can be created, and then the surfaces thereof modified with functional components directed for a particular application.

One illustrative goal of this concept is to build a membrane system that allows the surface to be derivatized with a functional group, and later reset so that it can be used again, but optimized for a different application. This concept accomplishes "reprogramming" the membrane surface by using a first element of a specific binding pair, such as but not limited to single-stranded DNA, attached to the membrane surface. This single-stranded DNA can be complexed with a complementary DNA strand, where the complementary strand has a functional group attached. After use, the complex can be disassociated and another complementary strand to the single-stranded DNA, having another functional group attached, can be complexed to provide a different surface functionalization.

The membranes and methods described herein have advantages that allow for relatively rapid industrial implementation. The membranes are "programmable" and can be adjusted to perform many different types of separations, including but not limited to changes to catalytic activity, pore size, surface chemistry, etc, as discussed below. The membranes are simple to modify, requiring only high-efficiency, specific pairing reactions to be performed. As a result, the functionalization, reconfiguration, and reuse of the membranes can be performed by the customer, presumably with on site technicians. The membranes are reversible, reconfigurable, and reusable. For example, a membrane that is programmed to have a small pore size in a first application may be regenerated by disassociating the complex on the surface, and the membrane may be reused, for instance as a catalytic system in a second application. A single base membrane can be used for many different applications. As a result, the membrane system benefits from substantial economies of scale compared with other smart systems, which must be crafted separately for each application. For example, a user may wish to reconfigure the membrane in the field, for example from microporous (which has higher fluxes) to nanoporous (which sacrifices flux in order to filter out smaller contaminants). Alternatively, a user may wish to switch between a catalytic membrane and a normal one, or between two catalytic membranes that target different materials.

Thus, reversibly-functionalized membranes can be prepared according to a method including contacting a membrane with a solution, wherein the membrane includes a surface having a first species operatively attached thereto, wherein the first species includes a first element of a specific binding pair; and the solution includes a second species including a second element of the specific binding pair, and at least one functional group, wherein each functional group is chemically bonded either directly or through a linking group to the second element of the specific binding pair, wherein upon contacting, the first and second elements of the specific binding pair form a complex on the surface of the membrane.

The term "specific binding pair" as used herein refers to two compounds that specifically bind to one another in a non-covalent manner, such as but not limited to a receptor (e.g., enzyme) and a ligand; an antibody and an antigen; complementary nucleic acids; or an aptamer and its target.

"Nucleic acids" may be any natural or synthetic nucleic acids, including DNA and RNA, and can be from 10 to 1,000 nucleotides in length. In certain embodiments, the nucleic acids are 10 to 100 nucleotides in length. In certain embodiments, the nucleic acids are 10 to 75 nucleotides in length; or 10 to 50 nucleotides; or 10 to 40 nucleotides in length. Shorter oligomers can be less costly but may not be robust; longer oligomers can be used for higher operating temperatures, or in harsher (e.g., pH or high salt concentration) environments.

For example, the specific binding pair can be complementary nucleic acids, such as two complementary single-stranded DNA molecules capable of forming duplex DNA, two complementary single-stranded RNA molecules capable of forming double-stranded RNA, or a single-stranded DNA molecule and a single-stranded RNA molecule capable of forming a DNA-RNA hybrid. It will be understood by one of skill in the art that the two individual nucleic acid molecules can form a binding pair complex under the appropriate hybridization or annealing conditions, and that such conditions can be optimized for the particular nucleic acid molecules at issue. It will be further understood by one of skill in the art that once formed, the duplex DNA, double-stranded RNA, or DNA-RNA hybrid can be disassociated under appropriate denaturation conditions. For example, formation or disassociation of the bound complex may be achieved through changes in temperature, pH, salt concentration, concentration of other chemicals, or a combination thereof. Furthermore, the complementary single-stranded nucleic acid molecules that form a specific binding pair do not need to be 100% matched, i.e. there may be mismatches in individual base pairs, with no specific limit on the number and position of mismatches, provided that the complementary single-stranded nucleic acid molecules will from a reversible binding pair under the appropriate conditions. It is well within the purview of one of skill in the art to assess the nature of the permissible mismatches, and the appropriate conditions for reversible binding. Thus, in certain embodiments where a first single-stranded nucleic acid molecule and a second single-stranded nucleic acid molecule are used as a specific binding pair in accordance with the invention, 1%, 2%, 3%, 4%, 5%, 10%, 15%, 20%, 25%, 30%, 35%, 40%, 45%, or 50% of the base pairs, for example, may be mismatched between the first and second single-stranded nucleic acid. Similarly, the number of mismatches may be within any range created by any two of previously recited percentages, for example 1-10%, 3-25%, 5-15%, etc.

Alternatively, the specific binding pair can be biotin and avidin or biotin and streptavidin, or analogs thereof (i.e. biotin or avidin/streptavidin molecules that have been modified but yet allow for reversible binding as described herein). In another example, the specific binding pair can be an antigen and an antibody. Suitable antigens include, but are not limited to, fluorescein, biotin, digoxigenin, or dinitrophenol. In a further example, the specific binding pair can also be an aptamer and its target molecule. Aptamers can be short nucleic acid or short peptides (e.g., 6-40 kDa) which strongly bind a target molecule, typically with binding constants ($K_D$) in the micromolar to nanomolar range (i.e., <1000 μM to <1000 nM). Aptamer targets can include, but are not limited to, an organic dye (e.g., fluorescein, Cy3, Cy5), a disaccharide (e.g., cellobiose, lactose, maltose, gentiobiose), an aminoglycoside (e.g., tobramycin, lividomycin, kanamycin A, kanamycin B, neomycin B), an antibiotic (e.g, viomycin and tetracyclin), dopamine, porphyrins (e.g., hematoporphyrin), and biotin.

The membrane can be any membrane familiar to those skilled in the art suitable for the intended purpose. In one example, the membrane can be a metal membrane or a metal-coated membrane. Suitable metal membranes include, but not limited to, stainless steel membranes, such as stainless steel filtration membranes available from Hitachi Metals (Japan) having an average pore size of about 0.50 µm to about 1.85 µm (e.g., 0.51 µm, or 1.03 µm, or 1.51 µm, or 1.83 µm). In another example, the membrane can be a metal-coated membrane, such as, a stainless steel membrane having an Au, Ag, Cu, Ni, Zn, or Pt coating layer; or a polymeric membrane having an optional metal coating layer (e.g., an Au, Ag, Cu, Ni, Zn, or Pt coating layer). In another example, the membrane can be a polymeric membrane having a metal coating layer.

The metal layer can be deposited on a surface of any of the preceding membranes according to any electrochemical methods familiar to those skilled in the art to provide a metal-coated membrane. For example, the metal layer can include Au, Ag, Cu, Ni, Zn, or Pt. In certain embodiments, the metal layer includes Au, Ag, or Cu. In other embodiments, the metal layer includes Au. In other embodiments, the metal layer includes Ag. In other embodiments, the metal layer includes Cu.

In one suitable method, the metal layer can be deposited by contacting the conductive membrane with a second solution, wherein the second solution includes a metal salt, under conditions suitable for electrodeposition of the desired metal layer. The deposition conditions can include, but are not limited to, standard electrochemical deposition methods or electroless methods in the presence of a chemical reductant. The metal salt can be, for example, an Au, Ag, Cu, Ni, Zn, or Pt salt. Suitable salts include, but are not limited to, auric acid, nickel sulfate, silver sulfate, copper sulfate, gold sulfate, gold thiosulfate, zinc sulfate, zinc chloride, platinum sulfate, and platinum chloride. In one particular example, the second solution can contain about 0.5 M zinc chloride and about 0.4 M boric acid.

The metal layer can be continuous over an entire surface of the conductive membrane or discontinuous, that is, pinholes are tolerable. The level of pinholes will be determined by the specification for a given application. The layer should be sufficiently continuous and have sufficient coverage to provide the desired function. However, perfect coverage is not required. In certain embodiments, the greater than 10% of the surface of the conductive membrane is coated by the deposited metal layer. In certain other embodiments, the greater than 20%; or greater than 30%; or greater than 40%; or greater than 50%; or greater than 60%; or greater than 70%; or greater than 80%; or greater than 90%; or greater than 95%; or greater than 98%; or greater than 99% of the surface of the conductive membrane is coated by the deposited metal layer.

The minimum thickness of the metal layer will be controlled by the pinhole spec for a given application. For example, for a porous membrane to be activated in all the pores, the coating should be a thick enough coating to ensure that all of the pores will be chemically altered, but thin enough to not plug the pores. In certain embodiments, the coating can have a thickness of about 50 nm about 1000 nm. In certain embodiments, the coating can have a thickness of about 50 nm about 500 nm; or about 50 nm to about 250 nm; or about 50 nm to about 100 nm. In one particular embodiment, the metal layer is a Zn layer having a thickness of about 50 nm to about 100 nm (e.g., 100 nm). Thickness can be determined by coulometry as is familiar to those skilled in the art.

In certain embodiments, when the membrane includes a polymeric membrane, the polymer can be a polycarbonate, a polyimide, a polyethersulfone, or a cellulose. In these embodiments, is not required that the membrane be conductive, rather, only that the first member of the specific binding pair can be operatively attached to the membrane surface. For example, the membrane can be a sintered porous polyethyleneterephthalate (PET) membrane or a microporous nitrocellulose membrane.

In one embodiment, the polymer is a polycarbonate. The term "polycarbonate" as used herein refers to those polymers whose repeat units are chemically bonded through —OC(O)O— groups. Examples of polycarbonates include, but are not limited to, poly(aromatic)carbonates, such as, poly(4,4'-(1-methylethylidene)bisphenol-co-carbonic acid); and poly(alkyl)carbonates, such as poly(ethylene glycol-co-carbonic acid).

In other embodiments, the polymer is a polyimide. The term "polyimide" as used herein means a polymer which can be formed from condensation of dianhydride and diamine monomers. An example of a polyimide is Kapton™ (poly (4,4'-oxydiphenylene-pyromellitimide)) which can be prepared by the condensation of pyromellitic dianhydride and 4,4'-oxydiphenylamine).

In yet other embodiments, the polymer is a polyethersulfone. The term "polyethersulfone" as used herein means a polymer which can be formed from condensation of a diphenol (such as bisphenol-A or hydroquinone) and bis(4-chlorophenyl)sulfone. Suitable commercially available polyethersulfone membrane include, but are not limited to, those filtration membrane available from General Electric Osmonics having average pore sizes of about 0.03 µm, about 0.10 µm, about 0.22 µm, about 0.45 µm, about 0.80 µm, about 1.20 µm, about 3 µm, about 5 µm, about 10 µm, and about 20 µm.

In yet other embodiments, the polymer is a cellulose. The term "cellulose" as used herein means a polysaccharide consisting of a linear chain of β(1→4) linked D-glucose units, ethers thereof, esters thereof, and mixtures thereof. Examples of celluloses include, but are not limited to, cellulose acetate, cellulose triacetate, cellulose propionate, cellulose acetate propionate, cellulose acetate butyrate, methylcellulose, ethylcellulose, hydroxyethylcellulose, hydroxypropylcellulose, hydroxyethylmethylcellulose, hydroxypropylmethylcellulose, and mixtures thereof.

In another example, the conductive membrane can include a polymer and carbon nanotubes. Such polymeric conductive membranes can be fabricated using conventional materials and methods. These membranes are conductive, and serve as an electrode in a membrane module when the nanotubes are applied in a loading between about 0.1 wt % and about 10 wt %. In certain embodiments, the nanotubes are applied in a loading between about 0.5 wt % and about 10 wt %; or about 1 wt % and 10 wt %; or above about 1 wt %.

The nanotubes can be any carbon nanotubes known to those skilled in the art, provided that the nanotubes are conductive. As used herein, "carbon nanotube" refers to nano-scale tubes made substantially of carbon atoms, having a structure based on graphite basal planes that are wrapped or curled to become a tube. The carbon nanotubes may include a variety of lengths, diameters, chiralities (helicities), number of walls, and they may be either open or capped at their ends. Furthermore, they may be chemically functionalized in a variety of manners. These could include semiconducting (bandgaps-1-2 eV), semi-metallic (bandgaps −0.001-0.01 eV) or metallic carbon nanotubes (bandgaps ~0 eV), and more particularly mixtures of the three types. Carbon nanotubes can have a diameter of from about 2 Å to over 20 µm. However, in one aspect, the carbon nanotubes may be single walled tubes. In another aspect, the nanotubes may be multiple walled.

In another embodiment, the nanotubes are acid-treated nanotubes. The term "acid-treated nanotubes" as used herein means conductive carbon nanotubes, as defined herein, that as a result of treatment with a strong acid, such as but not limited to, sulfuric acid, have surface groups, such as sulfonate and carboxylic acid groups, that can coordinate metal ions and/or nanoparticles.

The term "coordinate" as used herein refers to interactions, such as hydrogen bonding, ionic bonding, dipole-dipole interactions, cation-pi interactions, metal-ligand pi- and sigma-bonding, and the like which result in the formation of a stable complex.

A conductive membrane containing nanotubes can be prepared by casting a solution of the nanotubes and the polymer according methods familiar to those skilled in the art, such as, but not limited to, solvent evaporation, spray-drying, spin-coating, doctor-blading, and the like. In one embodiment, the conductive membrane containing the carbon nanotubes can be formed by preparing a solution containing the polymer and the conductive carbon nanotubes; and casting the second solution to provide the membrane. In one example, acid-treated nanotubes can be dispersed in a solvent such as N,N-dimethylacetamide (DMAc) and a polymer solution in DMAc is mixed with the nanotube dispersion, to create a single solution with both components. The membrane is cast as a thin film onto a porous support. Suitable solutions include a solvent capable of dissolving or suspending the polymer and nanotubes in a homogeneous manner.

Alternatively, for preparing a conductive membrane containing an essentially insoluble polymer, the membrane may be prepared by forming a solution of the nanotubes and a pre-polymer, such as a poly(amic acid), a polyimide precursor. A conductive membrane may be cast as described above, any residual solvent evaporated, and the membrane thermally treated under conditions suitable for imidization of the poly(amic) acid. A suitable temperature can readily be determined by one skilled in the art, for example, by thermal gravimetric analysis to determine the temperature at which the pre-polymer loses water. For example, see, Zhu et al, *Composite Sci. Tech.* 2006, 66, 548-554, which is hereby incorporated by reference in its entirety.

In another embodiment, the conductive membrane can be prepared by filtering a solution of the conductive carbon nanotubes through a commercially porous membrane. In such methods, the conductive membrane can be a microporous membrane or a nanoporous membrane. Microporous membranes can have average pore diameters of about 1.0 µm to about 100 µm. For example, the nanotubes are suspended in water at 0.01% solution, and the solution is passed through the membranes. The nanotubes should have lengths much greater than about 1 µm, so they do not pass through the membrane and the carbon nanotubes are caught; i.e., longer than the pore size of the membrane. For example, if the membrane pore size is 10 nm, the tubes can be less than 1 µm. In another example, the nanotubes can have lengths ranging from 1 µm to 1000 µm. The volume of liquid is chosen so that a film of roughly about 10 nm to about 1000 nm is created, where the film's conductivity can be confirmed by a simple two-point probe measurement.

In certain embodiments, the porous membrane is a nanoporous membrane. Nanoporous membranes can have average pore diameters of about 0.01 µm to about 1.0 µm. In certain other embodiments, the nanoporous membrane is a track-etched membrane. Examples of suitable track-etched membranes include, but are not limited to Nuclepore® (Whatman, Piscataway, N.J.) track-etched polycarbonate membrane having an average pore diameter between about 0.015 µm and 12.0 µm. For example, the track-etched membranes can have an average pore diameter that is about 0.015 µm, or 0.05 µm, or 0.08 µm, or 0.10 µm, or 0.20 µm, or 0.40 µm, or 0.60 µm, or 0.80 µm, or 1.0 µm, or 2.0 µm, or 3.0 µm, or 5.0 µm, or 8.0 µm, or 10.0 µm, or 12.0 µm. Other suitable materials include "ultraporous" membranes, such as the Puron™ membranes (Koch Membrane Systems, Wilmington, Mass.), having, for example, an average pore diameter of about 0.05 µm.

The first species, including the first element of a specific binding pair, can be operatively attached to membrane (e.g., the surface of the membrane) according to methods familiar to those skilled in the art. "Operatively attached" as used herein refers to the first element of a specific binding pair being attached or coordinated to the surface of a membrane in a manner such that the element remains attached to the surface under the conditions of the intended use of the membrane, for example, under the conditions within an operative water filtration system as described herein. Examples of operative attachments include direct chemical bonding to the surface, chemical bonding to the surface through a linking group, as defined herein, and association to the surface through a chemical group capable of reacting with or coordinating the membrane layer surface (such as, but not limited to, a thiol group associated with a gold surface).

The first species itself can consist essentially of the first element of a specific binding pair, or can include the first element of a specific binding pair operatively attached to a functional group capable of reacting with or coordinating to the membrane surface.

In one example, the first element of the specific binding pair can be operatively attached to the membrane by a direct bond. For example, nucleic acids (i.e., an example of a first element of a specific binding pair) can be directly bonded to a membrane (e.g., cellulose) by irradiation with ultraviolet light. In one example, an acid-washed cellulose can be mixed with a desired amount of a nucleic acid (e.g., calf thymus DNA at 2 mg/mL in 1 or 10 mM NaCl). The nucleic acid and cellulose can be kneaded together and dried. The mixture can then be suspended is a solvent (e.g., absolute ethanol) and the suspension placed under a low pressure mercury lamp (e.g., at a distance of about 10 cm from the surface of the suspension and exposed to 15 min of irradiation (about 100,000 ergs/mm$^2$) with continuous slow stirring).

In another example, the first element of the specific binding pair can be associated through a direct bond or through a linking group with a chemical group, such as a thiol, alcohol, phosphate, or carboxylic acid group, capable of reacting with or coordinating the membrane layer surface, For example, a first element of a specific binding pair can itself contain a thiol, or be chemically bonded to a thiol via a linking group, as defined herein; and the thiol group can associate, for example, with a gold surface.

Examples of linking groups include groups of the formula, —(C$_0$-C$_{10}$ alkyl-Q)$_{0-1}$—C$_0$-C$_{10}$ alkyl-, wherein Q is a bond, aryl, heteroaryl, C$_3$-C$_8$ cycloalkyl, or heterocyclyl; and no more than one methylene in each alkyl group is optionally and independently replaced by —O—, —S—, —N(R$^{00}$)—, —C(H)=C(H)—, —C≡C—, —C(O)—, —S(O)—, —S(O)$_2$—, —P(O)(OH)—, —OP(O)(OH)—, —P(O)(OH)O—, —N(R$^{oo}$)P(O)(OH)—, —P(O)(OH)N(R$^{oo}$)—, —OP(O)(OH)O—, —OP(O)(OH)N(R$^{oo}$)—, —N(R$^{oo}$)P(O)(OH)O—, —N(R$^{oo}$)P(O)(OH)N(R$^{oo}$)—, —C(O)O—, —C(O)N(R$^{oo}$)—, —OC(O)—, —N(R$^{oo}$)C(O)—, —S(O)O—, —OS(O)—, —S(O)N(R$^{oo}$)—, —N(R$^{oo}$)S(O)—, —S(O)$_2$O—, —OS(O)$_2$—, —S(O)$_2$N(R$^{oo}$)—, —N(R$^{oo}$)S(O)$_2$—, OC(O)O—, —OC(O)N(R$^{oo}$)—, —N(R$^{oo}$)C(O)O—, —N(R$^{oo}$)C(O)N(R$^{oo}$)—, —OS(O)O—, —OS(O)N(R$^{oo}$)—, —N(R$^{oo}$)S(O)O—, —N(R$^{oo}$)S(O)N(R$^{oo}$)—, —OS(O)$_2$O—, —OS(O)$_2$N(R$^{oo}$)—, —N(R$^{oo}$)S(O)$_2$O—, or —N(R$^{oo}$)S(O)$_2$N(R$^{oo}$)—, wherein each R$^{oo}$ is independently hydrogen or $C_1$-$C_6$ alkyl.

In another example, where the first element of the specific binding pair is operatively attached to the membrane by a direct bond or a linking group, the membrane or a polymer-grafted membrane can be treated with an agent capable of forming reactive groups on the surface of the membrane or a polymer-grafted membrane. For example, a surface having carboxylic acid groups can be treated with a carbodiimide, such as, but not limited to, 1-ethyl-3-(3-dimethylaminopropyl)carbodiimide, N,N'-diisopropylcarbodiimide, or dicyclohexylcarbodiimide to form anhydride groups on the surface. In another example, a surface having phosphate groups can be treated with 1,1-carbonyldiimiazole (CDI) to generate phosphorylimidazole groups on surface.

The modified membrane can then be treated with a nucleic acid solution under conditions suitable for reactive groups on the nucleic acid and the surface to react to form the bond or linking group (e.g., a C—C single, double, or triple bond, or a linking group, such as an amide, ester, phosphodiester, phosphoramidate, ether, thioether, thioester, urea, carbamate, carbonate, sulfonate, or sulfonamide). See, for example, Kato and Ikada, *Biotechnol. Bioeng.* 1996, 51, 581-590, which is hereby incorporated by reference.

In one embodiment, when the a membrane or a polymer-grafted membrane comprises carboxylic acid groups (e.g., a polyacrylic acid-grafted membrane), the agent capable of forming reactive groups, such as anhydride groups, on the surface can be a carbodiimide, such as, but not limited to, 1-ethyl-3-(3-dimethylaminopropyl) carbodiimide, N,N'-diisopropylcarbodiimide, or dicyclohexylcarbodiimide. The modified membrane can then be treated with a nucleic acid solution under conditions suitable for the nucleic acid and the modified surface to react to form a bond.

In another example, poly(acrylic acid) (PAAc) grafted onto PET microfibers can be reacted with a coupling agent (e.g., 26 mM EDC) under conditions suitable for modifying the carboxylic acid groups with the carbodiimide (e.g., in phosphate-buffered solution (PBS) of pH 4.8 at 4° C. for 3 h). The modified microfibers may be washed (e.g., twice with TE buffer) and the modified fibers treated with a DNA solution under conditions suitable for coupling the DNA to the microfibers (e.g., 1.0 mg/mL heat denatured ssDNA solution in TE buffer at 4° C. for 22 h).

In another example, PET microfibers grafted with poly(2-(methacryloyloxy)ethyl phosphate (PMOEP) chains can be reacted with an agent capable of generating reactive groups on the surface of the microfibers (e.g., immersed in 100 mg/mL 1,1-carbonyldiimiazole (CDI) solution in N,N-dimethylformamide (DMF) and allowed to stand at 20° C. for 16 h to generate phosphorylimidazole, which is easily attacked by nucleophilic compounds). The modified microfibers may be washed (e.g., with DMF and acetone) and the modified fibers treated with a DNA solution under conditions suitable for coupling the DNA to the microfibers (e.g., 1.0 mg/mL of dsDNA solution in PBS followed by lyophilization with the DNA solution, followed by immersion in pyridine at 50° C. for 24 h to form phosphodiester linkage between a phosphate group on the fiber).

Alternatively, the surface having reactive groups can be directly modified with a nucleic acid, optionally, in the present of a coupling agent. For example, a surface having phosphate groups can be treated with a carbodiimide and nucleic acid to form a pyrophosphate linkage between the phosphate groups in the surface and the nucleic acid.

In another example, a surface having epoxy groups can be treated with a nucleic acid to form amino linkage between the nucleic acid and the surface.

In another example, a surface having amino groups (which can be formed by hydrolysis of amide groups) can be treated with a solution of a nucleic acid having a phosphorylimidazole group to form a phosphoramidate linkage between the surface and the nucleic acid.

In another example, a surface having dialkyl amino groups (e.g., dimethylamino) on the surface can be treated with a nucleic acid for associate the nucleic acid with the surface through electrostatic interactions.

In another example, nucleic acids can be grafted to cellulose through a phosphodiester bond (e.g., —OP(O)(OH)O—) at a terminus of the nucleotide chain; or through a bifunctional oxirane, 1,4-butanediol diglycidyl ether, to activate the cellulose and subsequently bind the nucleic acid onto the epoxy-activated cellulose. Further examples of methods for grafting a nucleic acid to a cellulose surface can be found in Gilham, *J. Am. Chem. Soc.* 1962, 84, 1311; Gilham et al., *J. Am. Chem. Soc.* 1964, 86, 4985; Gilham, *J. Am. Chem. Soc.* 1964, 86, 4982; Naylor et al., *Biochemistry* 1966, 5, 2722; Astell et al., *J. Biol. Chem.* 1970, 246, 1944; Jovin et al., *J. Biol. Chem.* 1968, 243, 250; Litman, *J. Biol. Chem.* 1968, 243, 6222; Yamada et al., *Biomaterials* 2001, 22, 3121; Yamada et al., *Environ. Sci. Technol.* 2002, 36, 949; Yamada et al., *Bull. Chem. Soc. Jpn.* 2002, 75, 1627; and Moss et al., *J. Biol. Chem.* 1981, 256, 12655, each of which is hereby incorporated by reference in its entirety. For example, a nucleic acid can be grafted to a cellulose surface by treatment with a carbodiimide (such as, 1-ethyl-3-(3-dimethylaminopropyl)carbodiimide, N,N'-diisopropylcarbodiimide, or dicyclohexylcarbodiimide) and the nucleic acid.

The first element of a specific binding pair can also be operatively attached to metal membranes or metal-coated membranes by a direct bond; or by association of a chemical group capable of reacting with or coordinating the membrane layer surface. In one embodiment, when the first element of a specific binding pair itself includes functional groups capable of reacting with or coordinating the metal surface, then the first element can be directly attached. For example, first element of a specific binding pair that include —SH or —COOH groups can be associated with metal surfaces such as, but not limited to, gold, silver, and copper surfaces.

In another embodiment, the first species can be operatively attached to a metal membrane, metal-coated membrane, or membrane including conductive nanotubes by electrodeposition when the first species includes an electrochemically active compound operatively attached to the first element of the specific binding pair. That is, the chemical group capable of reacting with or coordinating the membrane layer surface is an electrochemically active compound.

The term "electrochemically active" as used herein means the compound is capable of forming a chemical bond with another compound, such as a nanotube or a metal surface, when exposed to electrooxidative or electroreductive conditions, as are familiar to those skilled in the art.

In this embodiment, the membrane can be contacted with a solution (e.g., aqueous solution) including the first species including an electrochemically active compound operatively attached to the first element of the specific binding pair. Electrochemical deposition occurs when a suitable electrochemical potential, as is familiar to those skilled in the art, is supplied to the system to induce deposition of the electrochemically active compound on the surface of the membrane to provide a functionalized membrane.

Many different organic moieties can be electroreduced onto a metal surface, metal-coated membrane surface, or membrane including conductive nanotubes. In one embodiment, each electrochemically active compound is an electropolymerizable monomer, such as a (meth)acrylate or a styrene. For example, each monomer can be, independently, a (meth)acrylate. As used herein, the use of the term "(meth)" followed by another term such as acrylate refers to both acrylates and methacrylates. For example, the term "(meth)acrylate" refers to either acrylate or methacrylate, and esters thereof; the term "(meth)acrylic" refers to either acrylic or methacrylic; the term "(meth)acrylic acid" refers to either acrylic acid or methacrylic acid. In certain embodiments, "(meth)acrylates" are independently compounds of the formula, or a salt thereof, wherein $R^1$ is hydrogen, $C_1$-$C_{10}$ haloalkyl, $C_2$-$C_{10}$ alkenyl, $C_2$-$C_{10}$ alkynyl, $C_1$-$C_{10}$ alkyl, aryl, heteroaryl, heterocyclyl, $C_3$-$C_8$ cycloalkyl, aryl($C_1$-$C_6$)alkyl, heteroaryl($C_1$-$C_6$)alkyl, ($C_3$-$C_8$)cycloalkyl($C_1$-$C_6$)alkyl, or heterocyclyl($C_1$-$C_6$)alkyl, each optionally substituted with halogen, cyano, nitro, —N($R^3$)$_2$, —N($R^3$)$_3^+$A$^-$, —OR$^3$, —SR$^3$, —S(O)$_2$OR$^3$, —C(O)OR$^3$, —C(O)N($R^3$)$_2$, —OC(O)OR$^3$, —N($R^3$)C(O)OR$^3$, —N($R^3$)C(O)N($R^3$)$_2$, or —O[CH$_2$CH$_2$O]$_n$R$^3$, wherein n is 1 to 250, each $R^3$ is independently hydrogen or $C_1$-$C_6$ alkyl; $R^2$ is hydrogen or methyl, and A$^-$ is an anion (e.g., a halide). When used to electrodeposit the first element of the specific binding pair, in at least a portion of the (meth)acrylate monomers, one of $R^1$, $R^2$, and $R^3$ is substituted with the first element of the specific binding pair. That is, a mixture of (meth)acrylate monomers can be used wherein at least a portion of the methacrylate monomers (at $R^1$, $R^2$, or $R^3$) include the first element of the specific binding pair. Modification of the carbon nanotube surface with a (meth)acrylate can provide a surface coating having of the formula, where n is greater than 2.

In another example, each monomer can be, independently, a styrene. The term "styrene" as used herein means a compound of the formula, wherein p is 0, 1 or 2; and each $R^0$ is independently hydrogen, $C_1$-$C_{10}$ haloalkyl, $C_2$-$C_{10}$ alkenyl, $C_2$-$C_{10}$ alkynyl, $C_1$-$C_{10}$ alkyl, aryl, heteroaryl, heterocyclyl, $C_3$-$C_8$ cycloalkyl, aryl($C_1$-$C_6$)alkyl, heteroaryl($C_1$-$C_6$)alkyl, ($C_3$-$C_8$)cycloalkyl($C_1$-$C_6$)alkyl, or heterocyclyl($C_1$-$C_6$)alkyl, each optionally substituted with halogen, cyano, nitro, —N($R^{30}$)$_2$, —N($R^{30}$)$_3^+$A$^-$, —OR$^{30}$, —SR$^{30}$, —S(O)$_2$OR$^{30}$, —C(O)OR$^{30}$, —C(O)N($R^{30}$)$_2$, —OC(O)OR$^{30}$, —N($R^{30}$)C(O)OR$^{30}$, —N($R^{30}$)C(O)N($R^{30}$)$_2$, or —O[CH$_2$CH$_2$O]$_m$R$^{30}$, wherein in is 1 to 250, each $R^{30}$ is independently hydrogen or $C_1$-$C_6$ alkyl; and A$^-$ is an anion (e.g., a halide). When used to electrodeposit the first element of the specific binding pair, in at least a portion of the styrene monomers, $R^0$ or $R^{30}$ is substituted with the first element of the specific binding pair. That is, a mixture of styrene monomers can be used wherein at least a portion of the styrene monomers (at $R^0$ or $R^{30}$) include the first element of the specific binding pair. Modification of the carbon nanotube surface with a styrene can provide a surface coating having of the formula, where m is greater than 2.

Figure 1:
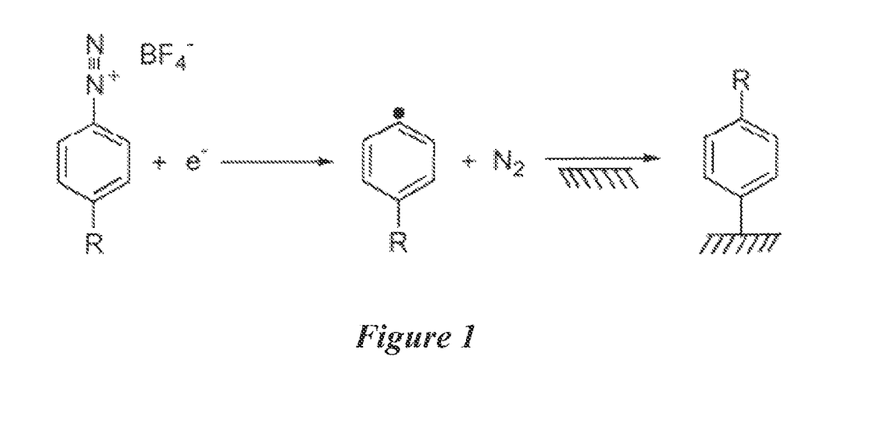
FIG. 1 illustrates the electroreduction of a diazonium salt to attach a functionalized radical to a metal surface or a nanotube.

In another embodiment, the electrochemically active compound is a diazonium salt. Electrochemical reduction of the diazonium salt can release nitrogen to form a radical which can react with a metal surface or a nanotube to functionalize a membrane surface, as shown in FIG. 1.

In one embodiment, the electrochemically active compound is an aryl diazonium salt, wherein the aryl group is substituted, either directly or through a linking group (as defined above), with the first element of the specific binding pair.

In another embodiment, each electrochemically active compound is independently of the formula, wherein R includes the first element of the specific binding pair and A$^-$ is a electrochemically acceptable anion. In another embodiment, each electrochemically active compound is independently of the formula, wherein R includes the first element of the specific binding pair and A⁻ is an electrochemically acceptable anion. In either embodiment, the first element of the specific binding pair can be directly bonded to the phenyl or can be operatively connected to the phenyl through a linking group (as defined above).

The term "electrochemically acceptable anion" as used herein means an anion which does not substantially interfere with the electrochemical deposition of the electrochemically active compound. Examples of suitable anions include, but are not limited to, halides, perchlorate, tetrafluoroborate, and hexafluorophosphate.

In one embodiment, the first species is of the formula, $X^1$—$Y^1$—$Z^1$, wherein $X^1$ is the first element of the specific binding pair; $Y^1$ is a direct bond or a linking group, as defined above, and $Z^1$ is a group capable of associating or reacting with the membrane surface (e.g., an electroactive compound, as defined above).

Upon contacting the membrane, including the first species, with the second species including the second element of the specific binding pair associated with one or more functional groups, the first and second elements of the specific binding pair can form a complex on the surface of the membrane. The functional groups associated with the second element of the specific binding pair allow for tuning of the properties of the membrane (for example, rendering it catalytically active, changing its hydrophilicity, or altering its pore size). In this way, a single base membrane may be optimized for a variety of functions at the point of use, enabling good economies of scale for the base membrane, and custom processes for the user.

The second species generally includes the second element of the specific binding pair; and at least one functional group, wherein each functional group is chemically bonded either directly or through a linking group to the second element of the specific binding pair.

In one embodiment, the second species is of the formula, X—Y—Z, wherein X is the second element of the specific binding pair; Y is a direct bond or a linking group, and Z is a functional group. Examples of suitable linking groups include those as described above.

The term "functional group" as used herein means a combination of atoms in a molecule, compound, composition or complex that tends to function as a single chemical entity and are responsible for the characteristic chemical properties and/or reactivity of that structure. In illustrative embodiments, functional groups include but are not limited to, hydrocarbons, groups containing halogen, groups containing oxygen, groups containing nitrogen and groups containing phosphorus and/or sulfur. Examples of functional groups include, but are not limited to, —$NH_2$ (amine), —COOH (carboxyl), siloxane, —OH (hydroxyl), —SH (mercapto), —$CONH_2$ (amido), —$S(O)_2OH$ (sulfonate), —S(O)OH (sulfinate), —$OS(O)_2OH$ (sulfate), and chemical groups including the same. Other examples of functional groups include antibodies, enzymes, nanoparticles, and the like.

In one example, the at least one functional group is a second polymer, an antibody, or an enzyme. In another example, the second polymer can be a polyethylene glycol, a poly carboxylic acid, a polycation as described below, or a polyanion, as described below.

"Poly carboxylic acids" refer to polymers having free carboxylic acid side-chains. Examples of poly carboxylic acids include, but are not limited to poly(acrylic acid), poly(maleic acid), and co-polymers thereof, e.g., poly (acrylic acid-co-maleic acid) poly (acrylic acid-co-(2-acrylamido-2-methylpropanesulfonic acid)), and poly (acrylic acid-co-acetonitrile). Poly carboxylic acids can chelate metals such as iron, palladium, platinum, gold, silver, and copper, and nanoparticles thereof, or metal ions, such and $Fe^{2+}$, $Fe^{3+}$, $Pt^{2+}$, $Pt^{4+}$, $Pd^{2+}$, $Cu^+$, $Cu^+$, $Au^+$, and $Ag^+$, which can be subsequently reduced to form a catalytic surface.

When a PEG chain is conjugated to a diazonium, the functionalized membrane can have a non-fouling surface. See Vadgama, P., ed. *Surfaces and Interfaces for Biomaterial*, CRC Press (Boca Raton, Fla.) 2005, pp. 763-776.

In one example, platinum nanoparticles, can be the functional materials that is chemically conjugated to a diazonium salt. Such modification can transform the membrane into a catalytically active system capable of decomposing organic pollutants. Diazonium salts conjugated to the nanoparticles can be provided at a concentration of about 0.1 mM to about 10 mM. In certain embodiments, the diazonium-conjugates can be provided at a concentration between about 1 mM and 10 mM or about 0.1 mM and 1 mM; or about 0.5 mM and 10 mM; or about 1 mM and 5 mM.

In another example, sialic acid can be the functional material that is chemically conjugated to a diazonium salt. A sialic acid modified membrane can be used to presence of an influenza virus in the contacting solution. The sialic acid can conjugate to hemagglutinin activity (HA) glycoproteins on the surface of influenza viruses, hereby reducing the pore size (or even shut down) by occluding the membrane pores. Such binding can be detected, for example, by a change in the flow rate of a source being filtered by the Emotionalized membrane, either in a solution setting or in an air filtration setting. In water, it is also possible to pre-load a binding moiety with a fluorescent target that gets released on binding of a new target. In this case, the fluorescence of the target in the effluent would be monitored to detect binding. In some embodiments, a similar approach may be used with air filtration.

In another example, polyanions (e.g., cation-exchange media) such as sodium poly(styrenesulfonate), or poly(2-acrylamido-2-methyl-1-propanesulfonic acid), or polycations (e.g., anion-exchange media) such as poly (acrylamido-N-propyltrimethylammonium chloride), can be the functional material that is chemically conjugated to a diazonium salt. Such polyanions, can preferentially reject dications such as $Mg^{2+}$ and $Ca^{2+}$ over monocations such as $Na^+$. Such polycations, can preferentially reject dianions such as $SO_4^{2-}$ and $PO^{3-}$ over monoanions, such as $OH^-$, $F^-$, or $Cl^-$ for use in water softening.

A polycation used herein, refers to a polymer that possesses multiple positive charges at the pH of intended use, for example between pH 5 and 8. Examples of polycations include, but are not limited to, chitosan, or poly(arginine), poly(lysine), poly(ornithine), or another polycation such as a cationic organic polymer for example poly(ethyleneimine) or poly(allylamine).

The term polyanion, as used herein, refers to a polymer that possesses multiple negative charges at the pH of intended use, for example between pH 5 and 8. Examples of polyanions include, but are not limited to, anionic polysaccharides, for example heparin, alginic acid or hyaluronic acid, or another polyanion, for example an anionic organic polymer such as poly(acrylic acid), poly(methacrylic acid) or poly(acrylic-co-methacrylic acid).

Alternatively, following formation of the complex on the surface of the membrane, the reversibly-functionalized membrane can be contacted with another solution including constituents (e.g., functional materials) which can react or associate with the functional groups that were deposited in the preceding steps. For example, a nanoparticle-coated reversibly-functionalized membrane can be prepared by contacting the reversibly-functionalized membrane with metal nanoparticles, wherein at least a portion of the functional groups present are capable of bonding to or coordinating to the nanoparticles.

The term "nanoparticles" as used herein means substantially spherical or irregularly shaped particles with an average diameter of between 1 nm and 1000 nm. The particles can include a single chemical element or a single alloy; or can include multiple elements or alloys in homogeneous (e.g., core-shell) or inhomogeneous compositions. In certain embodiments, the nanoparticles have an average diameter of between 1 nm and 500 nm; or 1 nm and 250 nm; or 1 nm and 100 μm; or 1 nm and 50 nm; or 1 μm and 10 nm. The average diameter of the nanoparticles can be determined according to methods familiar to those skilled in the art, for example, by dynamic light scattering.

Examples of suitable functional groups include, but are not limited to, $-NH_2$, $-COOH$, $-OH$, $-SH$, and chemical compounds including the same. Examples of nanoparticles which can be used include Au, Ag, or Pt nanoparticles and/or core-shell nanoparticles including a surface layer of Au, Ag, or Pt.

Ultimately, the original membrane can be recycled by subjecting the reversibly-functionalized membrane to conditions suitable for disassociating the complex formed between the first and second specific binding pairs, to provide to provide a clean membrane surface including the first species which may be re-functionalized according to the preceding methods by using an alternate second species.

For example, when the specific binding pair is complementary nucleic acids, the conditions can include heating the reversibly-functionalized membrane to a temperature above the melting temperature of the complex. Generally, if the resulting reversibly-functionalized membrane is to be used in a desired temperature range, then the melting temperature of the complex should be outside that range. In one example, for a membrane being used between about 20° C. and about 40°, the complex can have a melting temperature of about 50° C. to about 70° C.; or about 60° C. or greater.

In another example, when the specific binding pair is complementary nucleic acids and the conditions can include contacting the reversibly-functionalized membrane surface with a salt solution having a salt concentration suitable for disassociating the complex.

In yet another example, when the specific binding pair is complementary nucleic acids and the conditions can include contacting the reversibly-functionalized membrane surface with a aqueous solution having a pH suitable for disassociating the complex.

In certain examples where a protein is to be used to mediate the complex, may not be denatured by salt, acid, base, or surfactant, the complex can be disrupted by treatment with a competitive binding groups to displace the groups that forms the complex. For example, when the specific binding pair is biotin and avidin or biotin and streptavidin, then the complex can be disassociated by contacting the complex with free biotin.

In another aspect, the disclosure provides the reversibly-functionalized membranes prepared according to any of the embodiments described above.

In another aspect, the disclosure provides reversibly-functionalized membranes including a membrane and a complex operatively attached to a surface of the membrane, wherein the complex is formed by a specific binding pair, wherein the first element of the specific binding pair is chemically bonded either directly or through a linking group to the surface of the membrane; and the second element of the specific binding pair is chemically bonded either directly or through a linking group to a functional group.

In another aspect, the disclosure provides filtration membrane modules containing any of the membranes described above. In certain embodiments, the filtration membrane modules are air filtration membrane modules. In other embodiments, the filtration membrane modules are water filtration membrane modules and further comprise a counter electrode.

Figure 2:
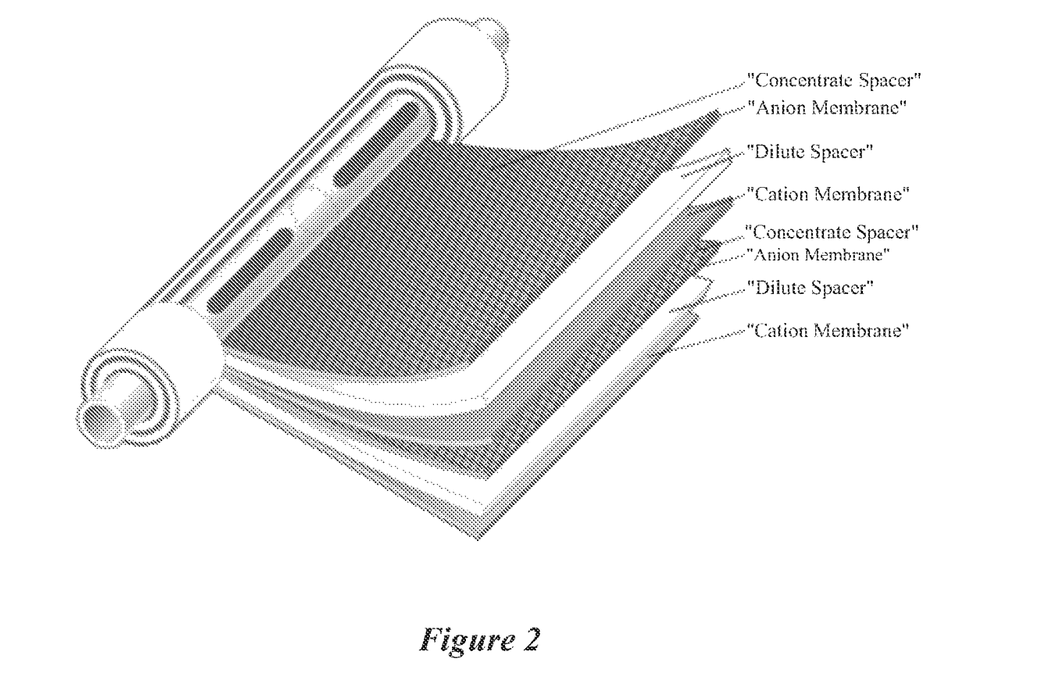
FIG. 2 shows a representative embodiment of a spiral wound membrane useful for electrodeionization.

Counterelectrodes can be fabricated from electrochemically inert materials such as gold, silver, platinum, or carbon. The concept of an electrically wired, electrochemically active membrane module has been demonstrated in electrodeionization (EDI), a technology that uses an electric field to draw salt out of an aqueous input stream. These systems are ideally constructed as spiral-wound modules as shown in FIG. 2, where the base membrane stack contains two electrodes (cathode and anode), separated by two ion-exchange membranes. One of the two electrodes can be the nanotube membrane and/or modified nanotube membrane as described above. In certain embodiments, a carbon counterelectrode can provide for electrochemical stability. Electrodes that are conductive because of carbon (nanotubes, carbon fibers, etc.) are useful because metal coatings can be removed, as noted above, in the presence of carbon without effecting the carbon.

An example of a spiral wound module for electrodeionization in which the membranes described herein can be used as U.S. Pat. No. 5,538,642, which is hereby incorporated by reference in its entirety.

In other embodiments, such water filtration membrane modules can contain three components, a nanotube membrane, as described above, the counterelectrode; and a separator disposed between the nanotube membrane and the counterelectrode. In this embodiment, an ion-exchange membrane is optional.

In another aspect, the disclosure provides methods for changing the pore size of a porous membrane including, contacting a reversibly-functionalized membrane as described in any of the preceding aspects and embodiments with metal nanoparticles, wherein at least a portion of the functional groups present are capable of bonding to or coordinating to the nanoparticles; and the membrane is a porous membrane. At least a portion of the functional groups present on the porous membrane are capable of bonding to or coordinating to the nanoparticles, and thereby, change the average pore size The nanoparticles can have any average diameter suitable for changing the pore size to a desired average size. For example, a porous membrane having an average pore size of about 200 nm, upon contacting with about 50 nm nanoparticles, can see a decrease in average pore size to about 100 mm. In other examples, by using appropriately sized nanoparticles, an average pore size of about 100 nm can be reduced to about 50 nm; or an average pore size of about 100 nm can be reduced to about 25 nm; or an average pore size of about 100 nm can be reduced to about 10 nm; or an average pore size of about 200 nm can be reduced to about 100 nm; or an average pore size of about 200 nm can be reduced to about 75 nm; or an average pore size of about 200 nm can be reduced to about 50 nm; or an average pore size of about 200 nm can be reduced to about 25 nm; or an average pore size of about 200 nm can be reduced to about 10 nm; or an average pore size of about 500 nm can be reduced to about 250 nm; or an average pore size of about 500 nm can be reduced to about 100 nm; or an average pore size of about 500 nm can be reduced to about 50 nm; or an average pore size of about 1000 mm can be reduced to about 500 nm; or an average pore size of about 1000 nm can be reduced to about 250 nm; or an average pore size of about 1000 nm can be reduced to about 100 nm.

Alternatively, the disclosure provides methods for changing the pore size of a porous membrane including, contacting a membrane with a solution, wherein the membrane is a porous membrane and includes a surface having a first species operatively attached thereto, wherein the first species includes a first element of a specific binding pair; and the solution includes a second species including a second element of the specific binding pair, and at least one functional group, wherein each functional group is chemically bonded either directly or through a linking group to the second element of the specific binding pair, wherein upon contacting, the first and second elements of the specific binding pair form a complex on the surface of the membrane, and wherein at least one functional group includes nanoparticles. Examples of suitable membranes, conductive carbon nanotubes, electrochemically active compounds, functional groups, and nanoparticles, and representative changes in pore sized are as described above.

DEFINITIONS

The term "alkyl" as used herein, means a straight or branched chain hydrocarbon containing from 1 to 10 carbon atoms, unless otherwise specified. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl. When an "alkyl" group is a linking group between two other moieties, then it may also be a straight or branched chain; examples include, but are not limited to —CH$_2$—, —CH$_2$CH$_2$—, —CH$_2$CH$_2$CHC(CH$_3$)—, —CH$_2$CH(CH$_2$CH$_3$)CH$_2$—.

The term "aryl," as used herein, means a phenyl (i.e., monocyclic aryl), or a bicyclic ring system containing at least one phenyl ring or an aromatic bicyclic ring containing only carbon atoms in the aromatic bicyclic ring system. The bicyclic aryl can be azulenyl, naphthyl, or a phenyl fused to a monocyclic cycloalkyl, a monocyclic cycloalkenyl, or a monocyclic heterocyclyl. The bicyclic aryl is attached to the parent molecular moiety through any carbon atom contained within the phenyl portion of the bicyclic system, or any carbon atom with the naphthyl or azulenyl ring. The fused monocyclic cycloalkyl or monocyclic heterocyclyl portions of the bicyclic aryl are optionally substituted with one or two oxo and/or thia groups. Representative examples of the bicyclic aryls include, but are not limited to, azulenyl, naphthyl, dihydroinden-1-yl, dihydroinden-2-yl, dihydroinden-3-yl, dihydroinden-4-yl, 2,3-dihydroindol-4-yl, 2,3-dihydroindol-5-yl, 2,3-dihydroindol-6-yl, 2,3-dihydroindol-7-yl, inden-1-yl, inden-2-yl, inden-3-yl, inden-4-yl, dihydronaphthalen-2-yl, dihydronaphthalen-3-yl, dihydronaphthalen-4-yl, dihydronaphthalen-1-yl, 5,6,7,8-tetrahydronaphthalen-1-yl, 5,6,7,8-tetrahydronaphthalen-2-yl, 2,3-dihydrobenzofuran-4-yl, 2,3-dihydrobenzofuran-5-yl, 2,3-dihydrobenzofuran-6-yl, 2,3-dihydrobenzofuran-7-yl, benzo[d][1,3]dioxol-4-yl, and benzo[d][1,3]dioxol-5-yl. In certain embodiments, the bicyclic aryl is naphthyl or a phenyl ring fused to either a 5 or 6 membered monocyclic cycloalkyl, a 5 or 6 membered monocyclic cycloalkenyl, or a 5 or 6 membered monocyclic heterocyclyl, wherein the fused cycloalkyl, cycloalkenyl, and heterocyclyl groups are optionally substituted with one or two groups which are independently oxo or thia.

The term "arylalkyl" and "-alkylaryl" as used herein, means an aryl group, as defined herein, appended to the parent molecular moiety through an alkyl group, as defined herein. Representative examples of arylalkyl include, but are not limited to, benzyl, 2-phenylethyl, 3-phenylpropyl, and 2-naphth-2-ylethyl.

The term "cycloalkyl" as used herein, means a monocyclic or a bicyclic cycloalkyl ring system. Monocyclic ring systems are cyclic hydrocarbon groups containing from 3 to 8 carbon atoms, where such groups can be saturated or unsaturated, but not aromatic. In certain embodiments, cycloalkyl groups are fully saturated. Examples of monocyclic cycloalkyls include cyclopropyl, cyclobutyl, cyclopentyl, cyclopentenyl, cyclohexyl, cyclohexenyl, cycloheptyl, and cyclooctyl. Bicyclic cycloalkyl ring systems are bridged monocyclic rings or fused bicyclic rings. Bridged monocyclic rings contain a monocyclic cycloallyl ring where two non-adjacent carbon atoms of the monocyclic ring are linked by an alkylene bridge of between one and three additional carbon atoms (i.e., a bridging group of the form —(CH$_2$)$_w$—, where w is 1, 2, or 3). Representative examples of bicyclic ring systems include, but are not limited to, bicyclo[3.1.1]heptane, bicyclo[2.2.1]heptane, bicyclo[2.2.2]octane, bicyclo[3.2.2]nonane, bicyclo[3.3.1]nonane, and bicyclo[4.2.1]nonane. Fused bicyclic cycloalkyl ring systems contain a monocyclic cycloalkyl ring fused to either a phenyl, a monocyclic cycloalkyl, a monocyclic cycloalkenyl, a monocyclic heterocyclyl, or a monocyclic heteroaryl. The bridged or fused bicyclic cycloalkyl is attached to the parent molecular moiety through any carbon atom contained within the monocyclic cycloalkyl ring. Cycloalkyl groups are optionally substituted with one or two groups which are independently oxo or thia. In certain embodiments, the fused bicyclic cycloalkyl is a 5 or 6 membered monocyclic cycloalkyl ring fused to either a phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the fused bicyclic cycloalkyl is optionally substituted by one or two groups which are independently oxo or thia.

"Cycloalkenyl" as used herein refers to a monocyclic or a bicyclic cycloalkenyl ring system. Monocyclic ring systems are cyclic hydrocarbon groups containing from 3 to 8 carbon atoms, where such groups are unsaturated (i.e., containing at least one annular carbon-carbon double bond), but not aromatic. Examples of monocyclic ring systems include cyclopentenyl and cyclohexenyl. Bicyclic cycloalkenyl rings are bridged monocyclic rings or a fused bicyclic rings. Bridged monocyclic rings contain a monocyclic cycloalkenyl ring where two non-adjacent carbon atoms of the monocyclic ring are linked by an alkylene bridge of between one and three additional carbon atoms (i.e., a bridging group of the form —(CH$_2$)$_w$—, where w is 1, 2, or 3). Representative examples of bicyclic cycloalkenyls include, but are not limited to, norbornenyl and bicyclo[2.2.2]oct-2-enyl. Fused bicyclic cycloalkenyl ring systems contain a monocyclic cycloalkenyl ring fused to either a phenyl, a monocyclic cycloalkyl, a monocyclic cycloalkenyl, a monocyclic heterocyclyl, or a monocyclic heteroaryl. The bridged or fused bicyclic cycloallcenyl is attached to the parent molecular moiety through any carbon atom contained within the monocyclic cycloalkenyl ring. Cycloalkenyl groups are optionally substituted with one or two groups which are independently oxo or thia.

The term "halo" or "halogen" as used herein, means —Cl, —Br, —I or —F.

The term "halide" as used herein means a fluoride, chloride, bromide, or iodide anion.

The term "haloalkyl" as used herein, means at least one halogen, as defined herein, appended to the parent molecular moiety through an alkyl group, as defined herein. Representative examples of haloalkyl include, but are not limited to, chloromethyl, 2-fluoroethyl, trifluoromethyl, pentafluoroethyl, and 2-chloro-3-fluoropentyl.

The term "heteroaryl," as used herein, means a monocyclic heteroaryl or a bicyclic ring system containing at least one heteroaromatic ring. The monocyclic heteroaryl can be a 5 or 6 membered ring. The 5 membered ring consists of two double bonds and one, two, three or four nitrogen atoms and optionally one oxygen or sulfur atom. The 6 membered ring consists of three double bonds and one, two, three or four nitrogen atoms. The 5 or 0.6 membered heteroaryl is connected to the parent molecular moiety through any carbon atom or any nitrogen atom contained within the heteroaryl. Representative examples of monocyclic heteroaryl include, but are not limited to, furyl, imidazolyl, isoxazolyl, isothiazolyl, oxadiazolyl, oxazolyl, pyridinyl, pyridazinyl, pyrimidinyl, pyrazinyl, pyrazolyl, pyrrolyl, tetrazolyl, thiadiazolyl, thiazolyl, thienyl, triazolyl, and triazinyl. The bicyclic heteroaryl consists of a monocyclic heteroaryl fused to a phenyl, a monocyclic cycloalkyl, a monocyclic cycloalkenyl, a monocyclic heterocyclyl, or a monocyclic heteroaryl. The fused cycloalkyl or heterocyclyl portion of the bicyclic heteroaryl group is optionally substituted with one or two groups which are independently oxo or thia. When the bicyclic heteroaryl contains a fused cycloalkyl, cycloalkenyl, or heterocyclyl ring, then the bicyclic heteroaryl group is connected to the parent molecular moiety through any carbon or nitrogen atom contained within the monocyclic heteroaryl portion of the bicyclic ring system. When the bicyclic heteroaryl is a monocyclic heteroaryl fused to a phenyl ring, then the bicyclic heteroaryl group is connected to the parent molecular moiety through any carbon atom or nitrogen atom within the bicyclic ring system. Representative examples of bicyclic heteroaryl include, but are not limited to, benzimidazolyl, benzofuranyl, benzothienyl, benzoxadiazolyl, benzoxathiadiazolyl, benzothiazolyl, cinnolinyl, 5,6-dihydroquinolin-2-yl, 5,6-dihydroisoquinolin-1-yl, furopyridinyl, indazolyl, indolyl, isoquinolinyl, naphthyridinyl, quinolinyl, purinyl, 5,6,7,8-tetrahydroquinolin-2-yl, 5,6,7,8-tetrahydroquinolin-3-yl, 5,6,7,8-tetrahydroquinolin-4-yl, 5,6,7,8-tetrahydroisoquinolin-1-yl, thienopyridinyl, 4,5,6,7-tetrahydrobenzo[c][1,2,5]oxadiazolyl, and 6,7-dihydrobenzo[c][1,2,5]oxadiazol-4(5H)-onyl. In certain embodiments, the fused bicyclic heteroaryl is a 5 or 6 membered monocyclic heteroaryl ring fused to either a phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the fused cycloalkyl, cycloalkenyl, and heterocyclyl groups are optionally substituted with one or two groups which are independently oxo or thia.

The term "heteroarylalkyl" and "-alkylheteroaryl" as used herein, means a heteroaryl, as defined herein, appended to the parent molecular moiety through an alkyl group, as defined herein. Representative examples of heteroarylalkyl include, but are not limited to, fur-3-ylmethyl, 1H-imidazol-2-ylmethyl, 1H-imidazol-4-ylmethyl, 1-(pyridin-4-yl)ethyl, pyridin-3-ylmethyl, pyridin-4-ylmethyl, pyrimidin-5-ylmethyl, 2-(pyrimidin-2-yl)propyl, thien-2-ylmethyl, and Chien-3-ylmethyl.

The term "heterocyclyl" as used herein, means a monocyclic heterocycle or a bicyclic heterocycle. The monocyclic heterocycle is a 3, 4, 5, 6 or 7 membered ring containing at least one heteroatom independently selected from the group consisting of O, N, and S where the ring is saturated or unsaturated, but not aromatic. The 3 or 4 membered ring contains 1 heteroatom selected from the group consisting of O, N and S. The 5 membered ring can contain zero or one double bond and one, two or three heteroatoms selected from the group consisting of O, N and S. The 6 or 7 membered ring contains zero, one or two double bonds and one, two or three heteroatoms selected from the group consisting of O, N and S. The monocyclic heterocycle is connected to the parent molecular moiety through any carbon atom or any nitrogen atom contained within the monocyclic heterocycle. Representative examples of monocyclic heterocycle include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, oxadiazolinyl, oxadiazolidinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to either a phenyl, a monocyclic cycloalkyl, a monocyclic cycloalkenyl, a monocyclic heterocycle, or a monocyclic heteroaryl. The bicyclic heterocycle is connected to the parent molecular moiety through any carbon atom or any nitrogen atom contained within the monocyclic heterocycle portion of the bicyclic ring system. Representative examples of bicyclic heterocyclyls include, but are not limited to, 2,3-dihydrobenzofuran-2-yl, 2,3-dihydrobenzofuran-3-yl, indolin-1-yl, indolin-2-yl, indolin-3-yl, 2,3-dihydrobenzothien-2-yl, decahydroquinolinyl, decahydroisoquinolinyl, octahydro-1H-indolyl, and octahydrobenzofuranyl. Heterocyclyl groups are optionally substituted with one or two groups which are independently oxo or thia. In certain embodiments, the bicyclic heterocyclyl is a 5 or 6 membered monocyclic heterocyclyl ring fused to phenyl ring, a 5 or 6 membered monocyclic cycloalkyl, a 5 or 6 membered monocyclic cycloalkenyl, a 5 or 6 membered monocyclic heterocyclyl, or a 5 or 6 membered monocyclic heteroaryl, wherein the bicyclic heterocyclyl is optionally substituted by one or two groups which are independently oxo or thia.

The term "oxo" as used herein means a =O group.

The term "saturated" as used herein means the referenced chemical structure does not contain any multiple carbon-carbon bonds. For example, a saturated cycloalkyl group as defined herein includes cyclohexyl, cyclopropyl, and the like.

The term "thia" as used herein means a =S group.

The term "unsaturated" as used herein means the referenced chemical structure contains at least one multiple carbon-carbon bond, but is not aromatic. For example, an unsaturated cycloalkyl group as defined herein includes cyclohexenyl, cyclopentenyl, cyclohexadienyl, and the like.

EXAMPLES

Example 1

Modification and Recycling of a Cellulose Membrane

A single-stranded DNA molecule is grafted to a polymer membrane according to literature methods (e.g., polymers containing carboxy-containing monomers, such as, cellulose, oxidized-polyethyleneterephthalate, and polyacrylic acid). For example, an amino-terminated DNA can be grafted to polymer via use of a carbodiimide in two steps: first, the cellulose to be modified is reacted with the carbodiimide (e.g., 1-ethyl-3-(3-dimethylaminopropyl) carbodiimide, N,N'-diisopropylcarbodiimide, or dicyclohexylcarbodiimide) to activate carboxy groups thereon; then the activated cellulose is reacted with the amino-terminated DNA. See, for example, Mangalam et al., "Cellulose/DNA Hybrid Nanomaterials." *Biomacromolecules* 2009, 10, 497-504; and Kato, K. and Ikada, Y., "Immobilization of DNA onto a Polymer Support and its Potentiality as Immunoadsorbant." *Biotechnol. Bioeng.* 1996, 51, 581-590.

A complementary single-stranded DNA molecule is grafted to an active component, such as an enzyme (e.g. glucose isomerase). For example, a streptavidin-conjugated single-stranded DNA, can be coupled to a biotinylated enzyme, such as a biotinylated glucose isomerase, to graft the enzyme to the ss-DNA. In another example, an amino-terminated ss-DNA can be grafted to an enzyme having available carboxyresidues (e.g., from Asp or Glu) via a chemically-mediated coupling as described above. See, for example, Niemeyer, C. M., "The developments of semisynthetic DNA-protein conjugates." *Trends in Biotechnology* 2002, 2Q, 395-401.

This latter protein/DNA conjugate is exposed to the surface and the complementary single-strands annealed. After the use, the complementary DNA is removed by an increase in temperature, change in pH, or addition of exogenous salts. In this example, the membrane pores can start out passive, become catalytic for the glucose isomerase reaction, and then the enzyme is removed to restore the original passive state of the membrane.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for providing a reversibly-functionalized membrane comprising:
    providing a membrane and solution, wherein:
    the membrane comprises,
        a porous support including a plurality of pores therein; and
        a conductive metal coating at least partially defining a surface having a first species operatively attached thereto, wherein the conductive metal coating has a thickness that coats an interior surface of at least some of the plurality of pores without clogging the at least some of the plurality of pores and the first species comprises a first element of a specific binding pair; and
    the solution comprises a second species comprising a second element of the specific binding pair and at least one functional group, wherein the at least one functional group is chemically bonded either directly or through a linking group to the second element of the specific binding pair; and the membrane can be reversibly-functionalized by contacting the membrane with the solution;
    contacting the membrane with the solution to functionalize the membrane with the at least one functional group of the second element of the specific binding pair;
    using the functionalized membrane to filter a substance.

2. The method of claim 1, wherein the membrane comprises a polymeric membrane having the conductive metal coating.

3. The method of claim 1, wherein the membrane comprises a track-etched membrane.

4. The method of claim 1, wherein the specific binding pair comprises complementary single-stranded nucleic acid molecules.

5. The method of claim 4, wherein the nucleic acid molecules comprise DNA molecules.

6. The method of claim 4, wherein the nucleic acid molecules comprise RNA molecules.

7. The method of claim 1, wherein the membrane comprises a cellulose membrane and the specific binding pair is complementary single-stranded DNA molecules.

8. The method of claim 1, wherein the first element of the specific binding pair is operatively attached to the membrane by a direct bond, or by association of a chemical group capable of reacting with or coordinating the membrane layer surface.

9. The method of claim 8, wherein the second species is of the formula, X—Y—Z, wherein X is the second element of the specific binding pair, Y is a linking group, and Z a functional group.

10. The method of claim 1, wherein at least one functional group comprises a second polymer, an enzyme, an antibody, or metal nanoparticles.

11. The method of claim 1, further comprising contacting the reversibly-functionalized membrane with metal nanoparticles, wherein at least a portion of the functional groups present are capable of bonding to or coordinating to the nanoparticles to provide a nanoparticle-coated reversibly-functionalized functionalized membrane.

12. A method for using a membrane comprising:
    contacting a membrane with a solution, wherein:
    the membrane is a porous membrane and comprises a conductive metal coating at least partially defining a surface having a first species operatively attached thereto, wherein the conductive metal coating has a thickness of about 50 nm to about 1000 nm that coats an interior surface of at least some of the plurality of pores without clogging the at least some of the plurality of pores and the first species comprises a first element of a specific binding pair; and
    the solution comprises a second species comprising a second element of the specific binding pair and at least one functional group, wherein the at least one functional group is chemically bonded either directly or through a linking group to the second element of the specific binding pair;
    in response to said contacting, the first and second elements of the specific binding pair form a complex on the surface of the membrane to form a reversibly functionalized membrane and one or more of the at least one functional group comprises nanoparticles; and
    using the functionalized membrane to filter a substance.

13. The method of claim 12, wherein the conductive metal coating has a thickness of about 50 nm to about 100 nm.

14. The method of claim 1, wherein the specific binding pair includes complementary nucleic acids, biotin and avidin, biotin and streptavidin, an antigen and an antibody, an enzyme and a ligand, or an aptamer and an aptamer target.

15. The method of claim 12, wherein the specific binding pair includes complementary nucleic acids, biotin and avidin, biotin and streptavidin, an antigen and an antibody, an enzyme and a ligand, or an aptamer and an aptamer target.

* * * * *

UNITED STATES PATENT AND TRADEMARK OFFICE
CERTIFICATE OF CORRECTION

PATENT NO. : 9,517,438 B2  
APPLICATION NO. : 13/383955  
DATED : December 13, 2016  
INVENTOR(S) : Miller Page 1 of 1

It is certified that error appears in the above-identified patent and that said Letters Patent is hereby corrected as shown below:

In the Specification

In Column 1, Lines 7-8, delete "§371 of International PCT/US2011/040149, filed" and insert -- § 371 of International Application No. PCT/US2011/040149, filed on --, therefor.

In Column 7, Line 57, delete "much greater" and insert -- greater --, therefor.

In Column 14, Line 36, delete "Emotionalized" and insert -- functionalized --, therefor.

In Column 16, Line 62, delete "100 mm." and insert -- 100 nm. --, therefor.

In Column 17, Line 10, delete "1000 mm" and insert -- 1000 nm --, therefor.

In Column 19, Line 4, delete "cycloallcenyl" and insert -- cycloalkenyl --, therefor.

In Column 19, Line 26, delete "0.6" and insert -- 6 --, therefor.

In Column 20, Line 10, delete "Chien-3-ylmethyl." and insert -- thien-3-ylmethyl. --, therefor.

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*